United States Patent [19]
Wodeslavsky

[11] Patent Number: 5,408,705
[45] Date of Patent: Apr. 25, 1995

[54] TOILET WATER RESERVOIR VALVE UTILIZING FLOAT AND HYDRAULIC ACTIVATORS

[76] Inventor: Josef Wodeslavsky, #5 Peter Lynas Ct., Tenafly, N.J. 07670

[21] Appl. No.: 230,146

[22] Filed: Apr. 19, 1994

[51] Int. Cl.⁶ .............................................. E03D 1/36
[52] U.S. Cl. ........................................ 4/366; 4/415; 137/400; 137/410
[58] Field of Search ................. 4/366, 367, 415; 137/400, 410, 413, 414; 251/41

[56] References Cited

U.S. PATENT DOCUMENTS

| | | | |
|---|---|---|---|
| 1,750,427 | 3/1930 | Paul | 4/366 |
| 2,020,463 | 11/1935 | Fillmann | 137/413 X |
| 2,466,375 | 4/1949 | Carbon | 251/41 X |
| 2,624,365 | 1/1953 | Hesson | 251/41 |
| 2,726,674 | 12/1955 | Davies | 137/414 X |
| 4,493,473 | 1/1985 | Rexer | 251/37 X |

FOREIGN PATENT DOCUMENTS 2176581 12/1986 United Kingdom ................. 4/366

Primary Examiner—Robert M. Fetsuga

[57] ABSTRACT

A toilet water reservoir inlet and outlet control valve utilizing a float and hydraulic activator. Both function simultaneously. Whenever the user flushes the toilet he will activate such valve, which will open to fill the reservoir with water, and the hydraulic activator will close the water inlet after a preset amount of time whether or not the reservoir is full of water. Such a valve will cut the water supply to the reservoir either by the float or by the hydraulic activator and such a valve includes a control to disable it partially in case of a bad part within it. Such a valve will enable the control the pressure to itself in order to prolong its life, and such a valve includes an adjustment that will control the cycle of closing such valve.

5 Claims, 9 Drawing Sheets

TOILET WATER RESERVOIR VALVE UTILIZING FLOAT AND HYDRAULIC ACTIVATORS

BACKGROUND OF THE INVENTION

FIELD OF THE INVENTION

This invention relates to valves that control the flow of water from a pressurized water line to the water reservoir. This valve will be controlled both by a float and by a hydraulically-pressured valve, preventing water leaks which occur in existing flush systems. This valve will shut off the inlet to the reservoir without regard to the water level in the reservoir. Such valve is disclosed in my earlier invention, which has been approved (U.S. Pat. No. 5,282,280). The present invention improves the previous one by eliminating a seal which could fail.

In my previous disclosure, the valve body consists of a diaphragm which pressed a valve to its seat in order to close or open the flow of water to the reservoir. Such diaphragm is being pushed by water pressure after a preset time or by a float lever mechanically whenever the water level in the reservoir rises to the filled level. The contact between the float lever and said diaphragm is a plunger which is connected to the diaphragm and extended through the valve body and out of the valve body. Such plunger is loosely fit to the valve body and a seal is placed in a groove at the valve body in order to assure sealing of the chamber where such diaphragm is seated.

Since such a seal in exposed to breakdown and failure, it is essential to eliminate this possibility by redesigning the structure of the valve body within the scope of the invention.

The object of the present invention is to achieve the advantages of the previous valve with a better, simplified design to assure its long life.

SUMMARY OF THE INVENTION

One object of this invention is to eliminate drawbacks to my previously-mentioned invention. The position of the float lever was relocated so that it presses directly on the inlet valve instead of pressing the extended plunger. This eliminates the used of a seal to close off the chamber.

Another object of this invention is to prolong the life of the diaphragm by restricting the water pressure acting on the diaphragm. A pre-set low level of water pressure will work on the diaphragm, not the full pressure of the water system.

A third goal of this invention is to eliminate water level fluctuation in the reservoir in case, for any reason, the hydraulic activator has failed and the float alone is left to control the flow of water to the reservoir.

The new valve design also includes means to control the amount of time needed to fill the chamber of the diaphragm in order to close the inlet to the reservoir after it has been opened by the user (in flushing the toilet). This is important since there is a need to control the water level in the reservoir by means of such a hydraulic activator.

All the above improvements have been added while maintaining the primary idea of a valve that is activated by both a float and a hydraulic activator, each acting independently.

DESCRIPTION OF THE PRESENTLY PREFERRED EMBODIMENT OF THE INVENTION

Figure 1:
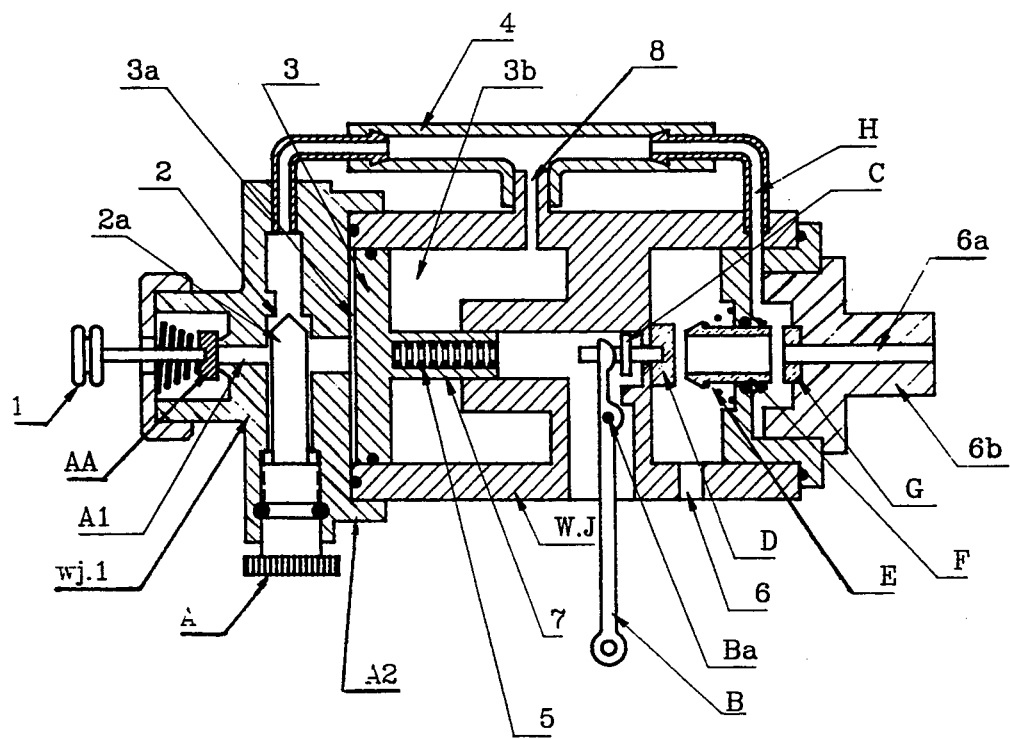
FIG. 1 will illustrate the embodiment activated by a piston.

Referring to FIG. 1, it illustrates the embodiment of a valve body W.J. which consists of a cylinder 3a with a piston 3 into the valve body WJ. There is a flow of pressurized water to the inlet 6a and a water outlet 6 to the reservoir. A lever B is pivoting on pin Ba. This lever is moved by means of a float (not shown). When lever B is acting on plunger pin C, it will press it toward valve seat Fa. The hollow valve (sleeve) F sits in its place through control by spring E. Seal G sits in threaded cup 6b. Furthermore, to the valve body WJ is mounted another valve body WJ1, which consists of a water adjustment screw A which can close on seat 2 and a valve AA that sits in closed position on seat A1. Between valve body WJ and valve body WJ1 there is a connection via pipe 4. Pipe 4 feeds water to the other side of the piston via conduit 8. Whenever water pressure is applied to the inlet, such water pressure will exist within the area on the other side of the piston. The complete embodiment is mounted in the water reservoir. Threaded cup 6B is bolted to the reservoir and to the pressurized water line.

The back side of piston 3 (side 3b) has less area and therefore is less exposed to water pressure than the front side of piston 3 (side 3a). The reason it has less area is that a portion of side 3b is attached to plunger 7, which is exposed to atmospheric pressure. Whenever equal water pressure will apply on both sides of said piston, it must move toward closing seal D. Whenever water pressure is released from side 3a of piston 3, the water pressure that remains against side 3b will bias piston 3 to move to the rest position. Means such as a screw can be added to adjust the flow of water through conduit 8.

Whenever the water pressure is applied it will run via port 6a via the sleeve F and out to the reservoir via port 6. Simultaneously the pressurized water will run via port H to pipe 4 to valve body WJ1 via open seat 2 to port 2a and acting on piston 3, the water pressure will force piston 3 to move. Piston 3 will move gradually until the spring 5 acts on plunger pin C, which will slide toward sleeve F and start to close the water flow from inlet 6a to the reservoir. Meanwhile the water level in the reservoir will rise to the point that the float activates lever B to push plunger pin C toward seat Fa. After sufficient water accumulates in the cylinder 3a and the piston has been pushed by the water pressure from the other side of the piston 3, the piston 3 will move until spring 5 presses plunger pin C with seal D against seat Fa and begins to restrict the water from flowing to the reservoir via port 6. After seat Fa is closed water pressure will continue to build against piston 3 which will be pushed, and it in turn will push the sleeve F toward seal G which will block the water flow from port 6a to port H and eventually will not let the water pressure increase, keeping the water pressure on piston 3 low. This keeping of the water pressure as low as possible is very important, particularly if the design of the valve body utilizes a diaphragm instead of a piston, since a diaphragm exposed to water pressure will wear faster.

The sleeve F will serve three purposes. In the first, described above, it will maintain low pressure on piston 3. The second purpose is that in case of a leak in seal A2, all the water will drain to the reservoir and water pressure will not be able to build up and push piston 3 and, on the other hand, even if the float rises and closes seal D the water will continue to build up in the reservoir above the set level and the float will continue to rise, building more force on the float until the force applied on spring E will be strong enough to push sleeve F all the way against spring E until the sleeve F will seat on seal G and block the water flow from inlet 6a to piston 3, which will be left disabled. This will protect the system from flooding which could occur from a leak from valve AA in the hydraulic activator.

The other purpose that sleeve F serves is to eliminate water fluctuation in case the valve body functions only in part, in other words, in case the hydraulic activator seizes or is disabled as a result of an internal leak and the float system is left to act alone. In such a case, if water enters the reservoir via port 6, the float will rise in order to shut it off. Plunger pin C will push sleeve F against spring E. The moment the flow of water stops on seat Fa the water pressure on the side of seat Fa will be lower than on side of seal G. Therefore the pressure will push sleeve F against seal D, forcing plunger pin C against lever B, which in turn presses the float into the water and holding seal D tight against sleeve F.

If the user flushes the water by using the handle that operates the flush valve which is connected to rod 1, he simultaneously opens the valve AA which lets the water escape from cylinder 3a and causes the water pressure from the other side of piston 3 to return piston 3 to the rest position which releases spring 5 from pressing on plunger pin C which will move from seat Fa which will let water from inlet 6a run into the reservoir.

The screw A will adjust the penetration of water to cylinder 3a. The time that it takes to fill the cylinder with water will be the time that it takes to close plunger pin C. A complete cycle is the time from the opening of inlet 6b to its closing, and the user will be able to adjust the time of a complete cycle.

Spring 5 will put a pre-set amount of pressure on plunger pin C in order not to ruin seals D and G by means of the force of piston 3, which is not in direct contact with these seals.

Figure 2:
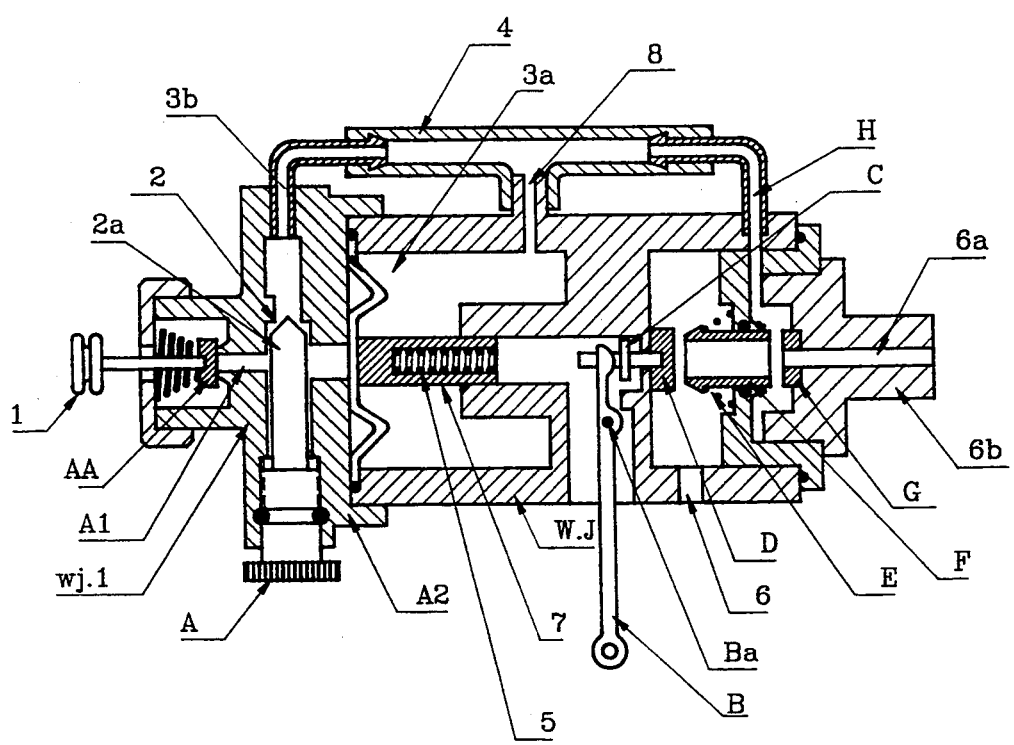
FIG. 2 will illustrate the embodiment activated by a diaphragm.

FIG. 2 will illustrate the same embodiment as FIG. 1 but, instead of piston 3 and cylinder 3a, there are diaphragm 3b and chamber 3a. The diaphragm 3b will transfer the force to spring 5. The description which is applicable to FIG. 1 will also be applicable to FIG. 2.

Figure 3:
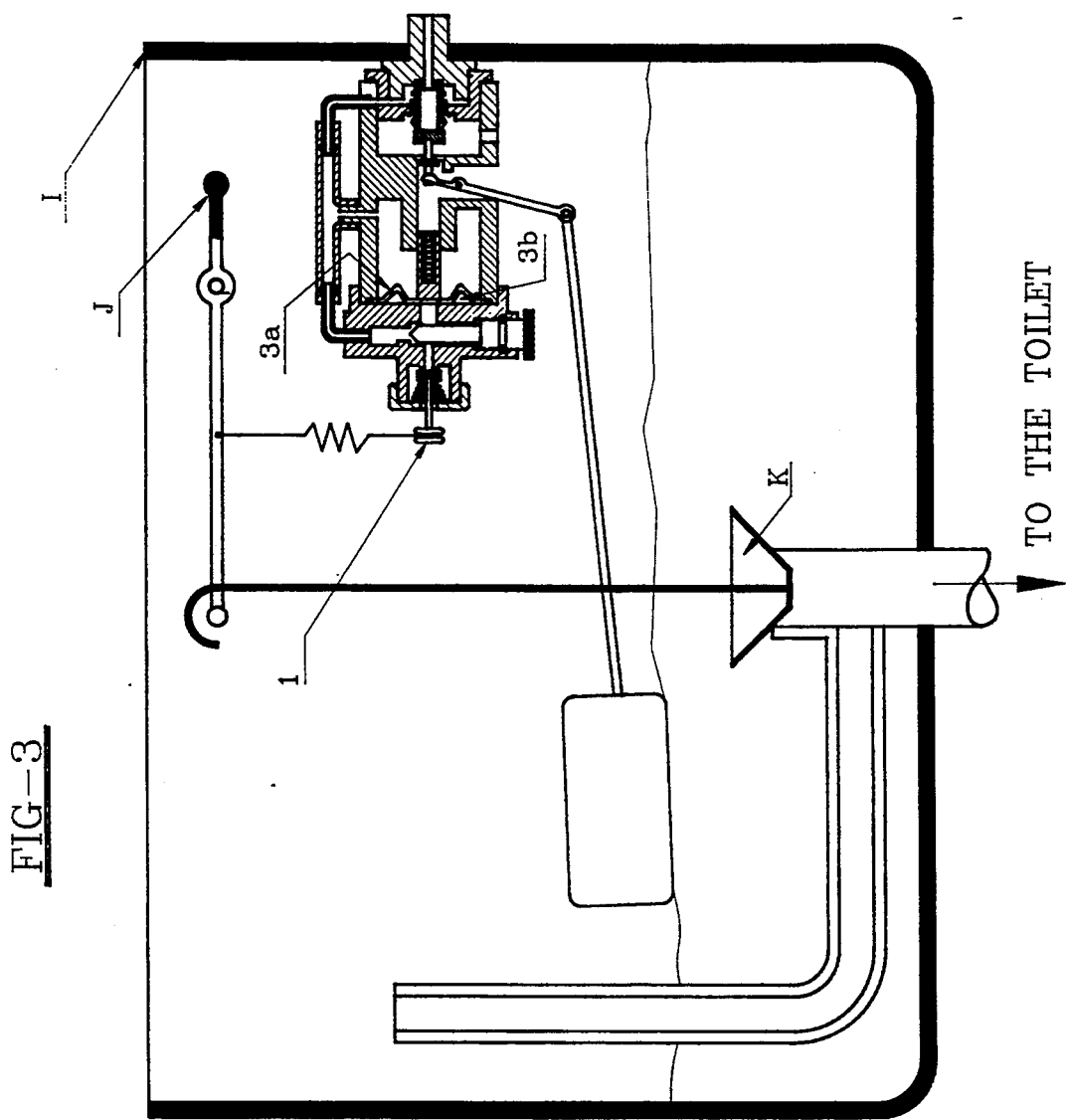
FIG. 3 will illustrate the embodiment mounted in the toilet water reservoir. The float system is activated, and the hydraulic activator is disabled.

FIG. 3 will illustrate the embodiment installed in the toilet reservoir I. The handle J that opens the valve K that flushes the toilet is connected to rod 1 and valve AA that vents the diaphragm- or piston- and both the flush valve and the vent valve simultaneously will be opened.

Figure 4:
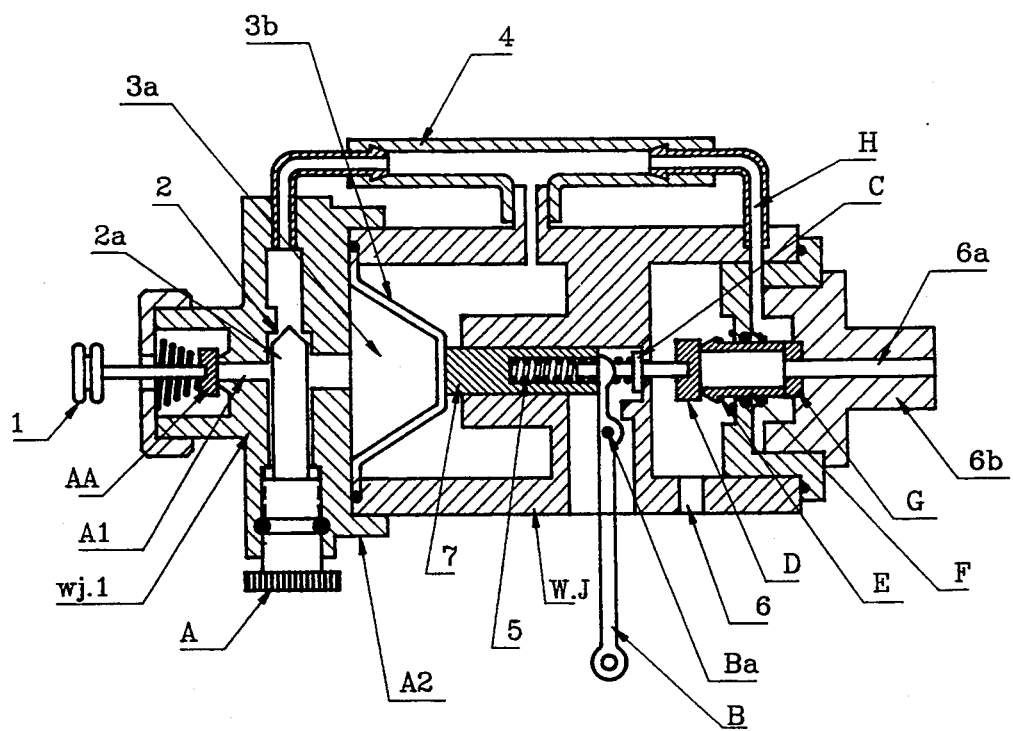
FIG. 4 will illustrate the embodiment in the active position whereby the inlet to the reservoir is closed by the diaphragm and the pressurized water to the diaphragm chamber is restricted.

FIG. 4 will illustrate the embodiment which consists of a diaphragm 3b. Seal D is closed since enough water has accumulated in chamber 3a via restricted passage 2 and screw A, seal G is almost closed and no more water will need to penetrate the chamber 3a. There is equilibrium of water pressure that acts on the diaphragm and water pressure that penetrates from the intake between seal G and sleeve F, since the movement of the diaphragm 3b will move the sleeve F against spring E to close seal G. This method will assure that only the minimum pressure needed to move diaphragm 3b against the force of spring 5 will apply, not all of the water pressure in the system. Low pressure will give the diaphragm a long life.

Figure 5:
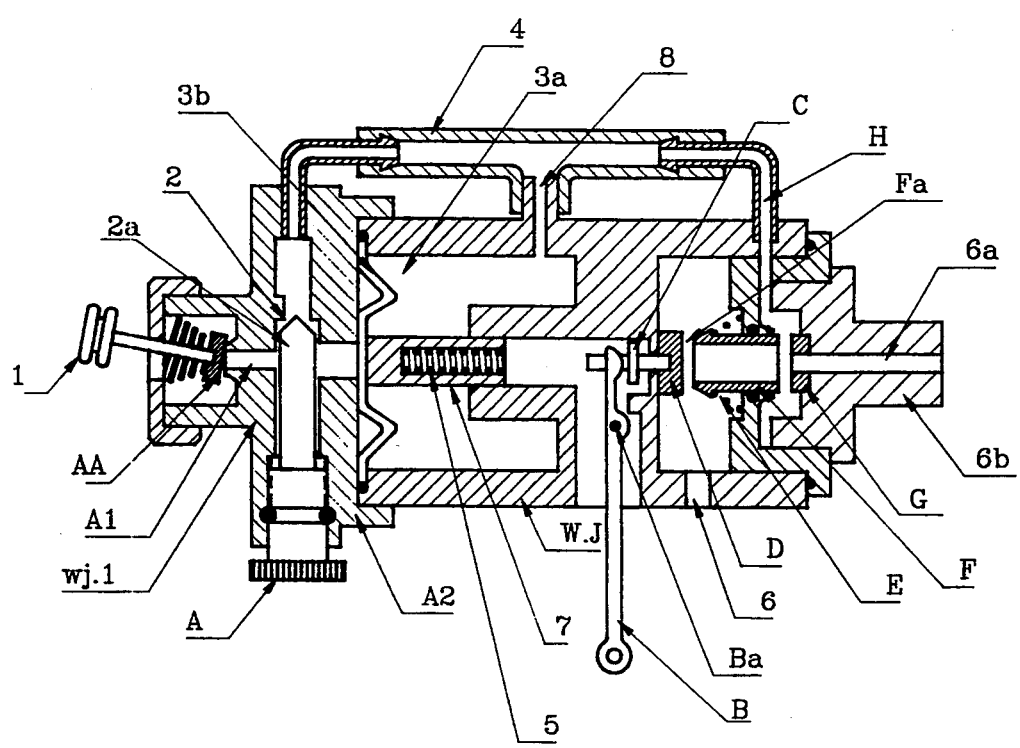
FIG. 5 will illustrate the embodiment in the non-active position whereby the vent valve drains the water from the diaphragm chamber.

FIG. 5 will illustrate the embodiment with vent vane AA open. It is connected to the flush valve handle. Whenever the user flushes the toilet he will open this valve to vent the pressure in chamber 3a, causing water pressure from the other side of the diaphragm to push back the diaphragm and release plunger pin C from seat Fa and release sleeve F so spring E will push it back and seal G will open and let water flow to chamber 3a.

Figure 6:
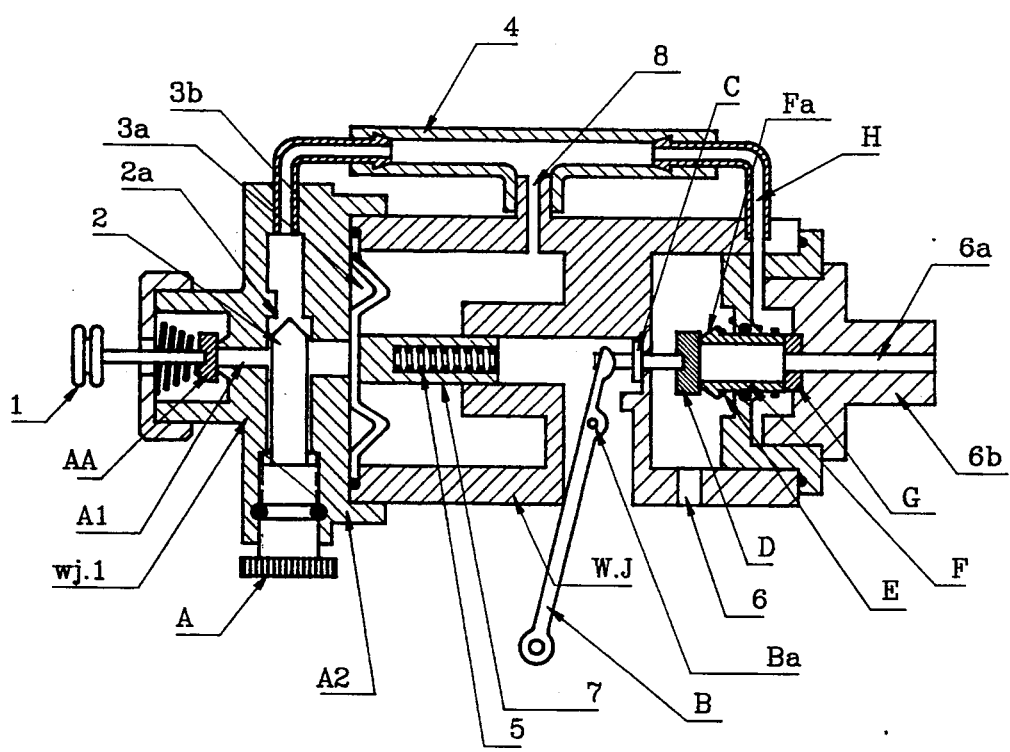
FIG. 6 will illustrate the embodiment whereby the float lever acts alone and closes the water inlet to the reservoir as well as the water flow to the hydraulic activator.

FIG. 6 will illustrate the float lever in active position. Diaphragm 3b, does not move in case of a water leak either in vent valve AA or from diaphragm 3b. Such a water leak will permit the float to raise the lever B which will apply pressure on plunger pin C which will close seal D on seat Fa which will shut off the water flow to the reservoir. But since water will continue to enter from the leak from the failed diaphragm 3b or the failed seal of valve AA, such a leak will continue to build up in the reservoir. Such an excessive amount of water will put excessive pressure on the float, which will work on plunger pin C and seal D, which will overcome the force of spring E. Sleeve F will move toward seal G which will close the water flow to chamber 3a via pipe 4. The method will serve the purpose of a safety device to protect the embodiment from an internal leak in the valve itself which could create a flood in the reservoir in case of a failed seal or diaphragm. This method will disable itself in case of worn parts in the valve.

Figure 7:
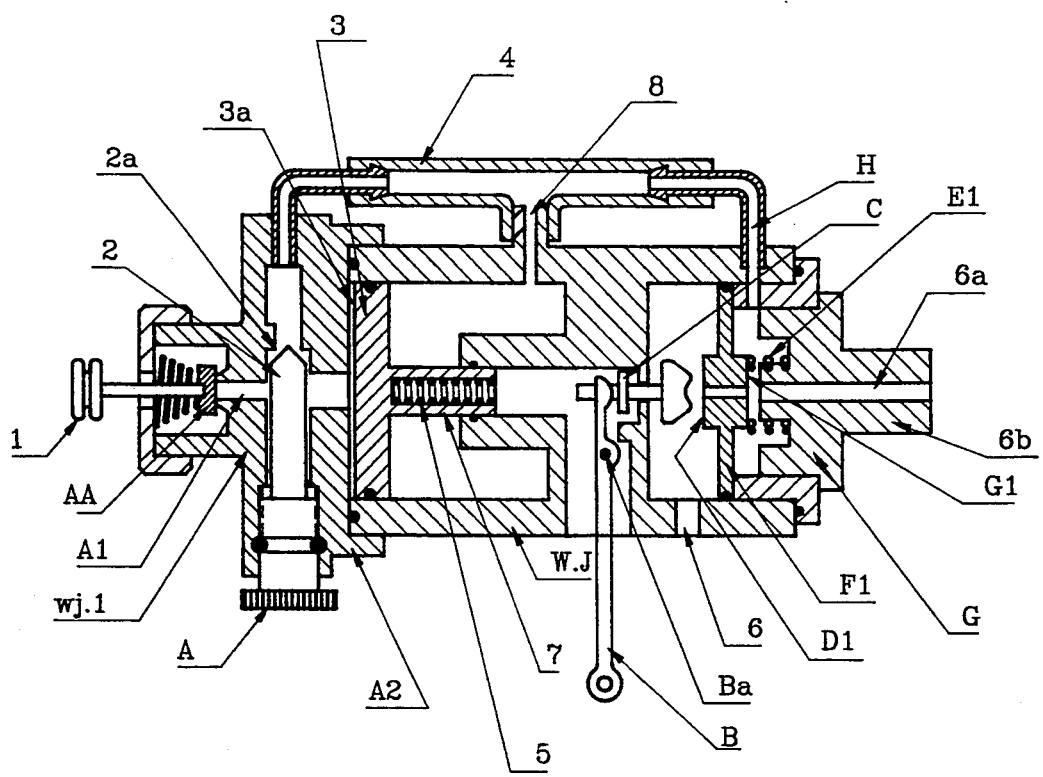
FIG. 7 will illustrate the embodiment utilizing a different internal sealing system, using an additional diaphragm.

FIG. 7 will illustrate an embodiment which consists of different sealing means. The rubber membrane F1 seals on both sides, side D1 facing pin plunger C, and side G1 facing threaded cup 6b. Spring E1 will fill the same function as in the prior embodiments.

Figure 8:
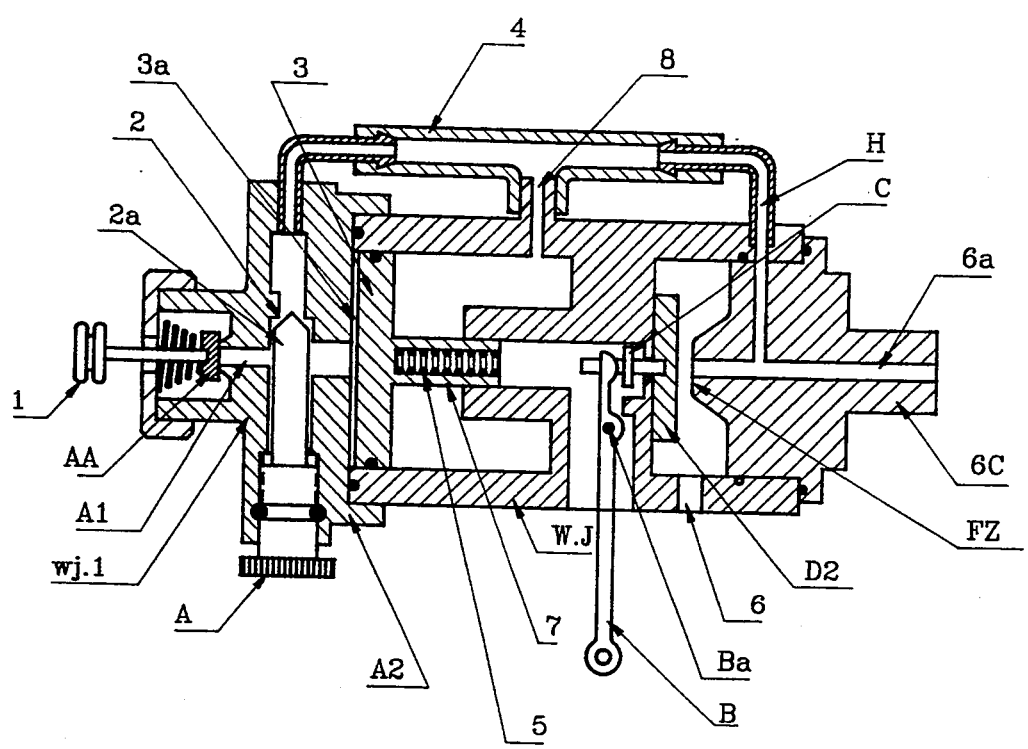
FIG. 8 will illustrate the embodiment utilizing a different internal sealing system, using an ordinary valve to shut off the outlet.

FIG. 8 will illustrate an embodiment which consists of different sealing means, the seal D2 and seat F2 serve only the purpose of opening and closing between the water inlet and the water outlet to the reservoir without pressure being reduced to piston 3 or to the diaphragm.

Figure 9:
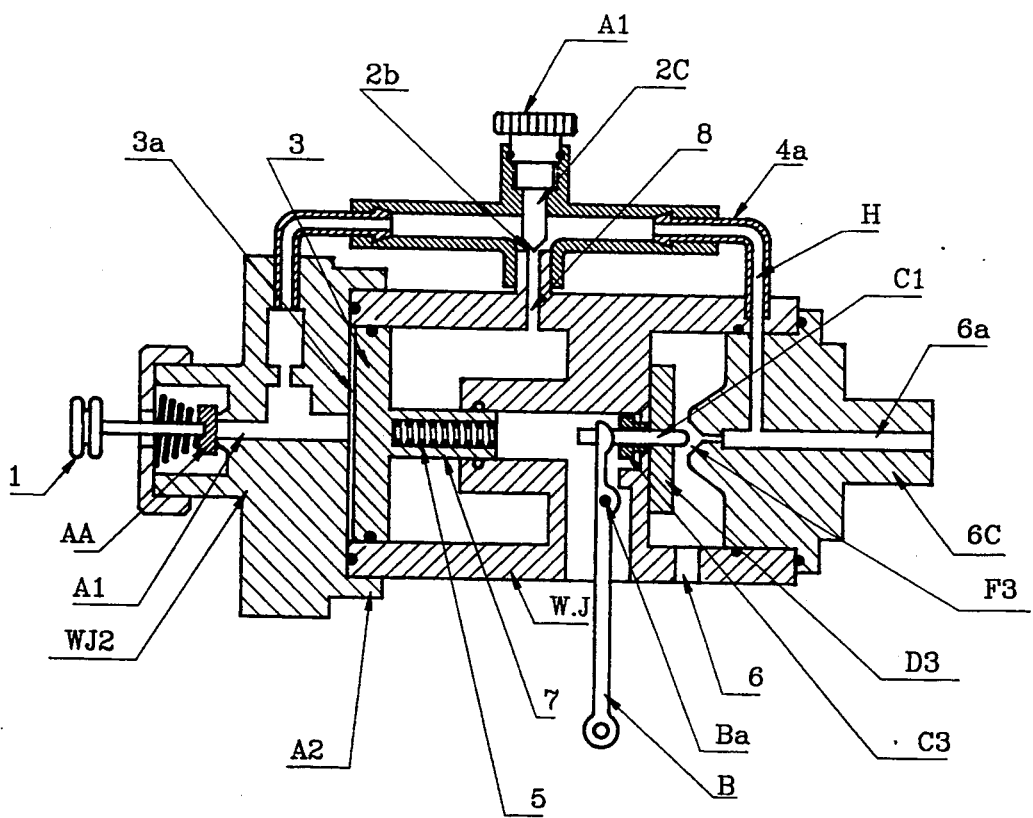
FIG. 9 will illustrate the embodiment utilizing a different internal sealing system, using two independent seals, one activated by the float lever and the other activated by the hydraulic activator; also, a screw is utilized to control the back water pressure created by the piston.

FIG. 9 will illustrate an embodiment which consists of different sealing means to close the water inlet from port 6a. The plug 6c contains two valve seats, C2 that can be sealed by valve pin C1, which spring 5 acts on whenever the hydraulic activator is pushed by water; and seal D3 which will seal on seat F3 whenever sleeve C3 will be pushed by float lever B. This assures that the two independent seals will work separately (for double safety). Also, the adjustable screw A1 will control the back pressure on the back side of piston 3. It will control the time of the movement of piston 3 instead of (in the other embodiment) the adjustable screw that controlled the flow of water into the chamber.

I claim:

1. A water closet refill valve for use in a reservoir connected to a pressurized water supply and containing water at a water level, said reservoir having a gravity-operated flush valve opened by a movable flush lever, said refill valve comprising:

a valve body adapted to be disposed within said reservoir and having a valve seat adapted to be connected to said pressurized supply and an actuator chamber defined therein;

an actuator movably and sealingly disposed in said actuator chamber defining first and second chambers;

valve means for controlling water flow from said valve seat, said valve means having first and second flow paths, said first flow path communicating with said reservoir and said second flow path communicating with said chambers on both sides of said actuator;

a relief valve disposed in communication with said second flow path and said reservoir;

a plunger in said valve body disposed between, and engagable with, said valve means and said actuator;

a float and float lever movably mounted to said valve body and responsive to said water level, said float lever engaging said plunger when said float is in a position corresponding to a high water level in said reservoir; and means for connecting said relief valve to said flush lever;

whereby, when said flush and relief valves close after a flush, water flows along said first flow path to refill said reservoir and flows along said second flow path to said chambers to move said actuator toward said plunger, said actuator and said float lever will engage said plunger which in turn will engage said valve means to stop water to flow at least said reservoir, and operation of said flush handle will open said flush and relief valves.

2. A valve according to claim 1 wherein said actuator is a piston.

3. A valve according to claim 1 wherein said actuator is a diaphragm.

4. A valve according to claim 1 wherein said valve means is a membrane.

5. A valve according to claim 4 wherein said membrane and said plunger are capable of stopping flow through both said first and second flow paths.

* * * * *